US009656898B2

(12) United States Patent
Ghione et al.

(10) Patent No.: US 9,656,898 B2
(45) Date of Patent: May 23, 2017

(54) AUTOMATIC SUBSTITUTION OF BLANK MOLDS IN THE MANUFACTURE OF HOLLOW GLASS PRODUCTS

(75) Inventors: Samuele Ghione, Acqui Terme (IT); Evelino Zanella, Carcare (IT)

(73) Assignee: SAINT-GOBAIN EMBALLAGE, Courbevoie (FR)

( * ) Notice: Subject to any disclaimer, the term of this patent is extended or adjusted under 35 U.S.C. 154(b) by 917 days.

(21) Appl. No.: 13/128,310

(22) PCT Filed: Nov. 9, 2009

(86) PCT No.: PCT/FR2009/052151
§ 371 (c)(1),
(2), (4) Date: Aug. 4, 2011

(87) PCT Pub. No.: WO2010/055251
PCT Pub. Date: May 20, 2010

(65) Prior Publication Data
US 2011/0296874 A1    Dec. 8, 2011

(30) Foreign Application Priority Data

Nov. 12, 2008 (FR) ..................... 08 57658

(51) Int. Cl.
*C03B 40/02* (2006.01)
*C03B 9/193* (2006.01)
(Continued)

(52) U.S. Cl.
CPC ............... *C03B 9/193* (2013.01); *C03B 9/16* (2013.01); *C03B 9/41* (2013.01); *C03B 40/027* (2013.01); *Y02P 40/57* (2015.11)

(58) Field of Classification Search
CPC .......... C03B 40/027; C03B 9/41; Y02P 40/57
(Continued)

(56) References Cited

U.S. PATENT DOCUMENTS 1,336,317 A * 4/1920 Pottorff ........................... 65/260
3,666,433 A * 5/1972 Nebelung et al. ............... 65/158
(Continued)

FOREIGN PATENT DOCUMENTS

EP    0 635 459       1/1995
EP    0635459     *  1/1995 ............. C03B 11/00
(Continued)

OTHER PUBLICATIONS

International Search Report Issued Mar. 10, 2010 in PCT/FR09/052151 filed Nov. 9, 2009.

*Primary Examiner* — Michael H Wilson
*Assistant Examiner* — Yana B Krinker
(74) *Attorney, Agent, or Firm* — Oblon, McClelland, Maier & Neustadt, L.L.P.

(57) ABSTRACT

A process for manufacturing a hollow glass product using an I.S. machine and a robot that can move alongside blank molds of the I.S. machine, wherein the robot is capable of replacing one or more blank molds, section after section. The I.S. machine for manufacturing hollow glass products includes a robot that can move alongside the blank molds, and the robot is capable of carrying plural tools having different functions, simultaneously and/or alternately, chosen from an electromagnet, and/or a spray tube for greasing by spraying, and/or an optical pyrometer, an infrared or equivalent viewing port, and/or a rotary abrasive tool, and/or a camera or equivalent.

9 Claims, 1 Drawing Sheet

(51) Int. Cl.
*C03B 9/16* (2006.01)
*C03B 9/41* (2006.01)
*C03B 40/027* (2006.01)

(58) Field of Classification Search
USPC .............................................. 65/79, 26, 169
See application file for complete search history.

(56) References Cited

U.S. PATENT DOCUMENTS

| | | | |
|---|---|---|---|
| 5,624,473 A * | 4/1997 | Farkas et al. .................... | 65/158 |
| 2003/0167799 A1 * | 9/2003 | Tijerina-Ramos et al. ....... | 65/68 |
| 2008/0152750 A1 | 6/2008 | Tanaka | |
| 2009/0173105 A1 * | 7/2009 | Zanella et al. .................... | 65/26 |

FOREIGN PATENT DOCUMENTS

| | | | | |
|---|---|---|---|---|
| EP | 1 006 420 | | 6/2000 | |
| EP | 1006420 A1 * | | 6/2000 | ........... G05B 19/042 |
| FR | 2 901 551 | | 11/2007 | |
| FR | 2901551 A1 * | | 11/2007 | |

* cited by examiner

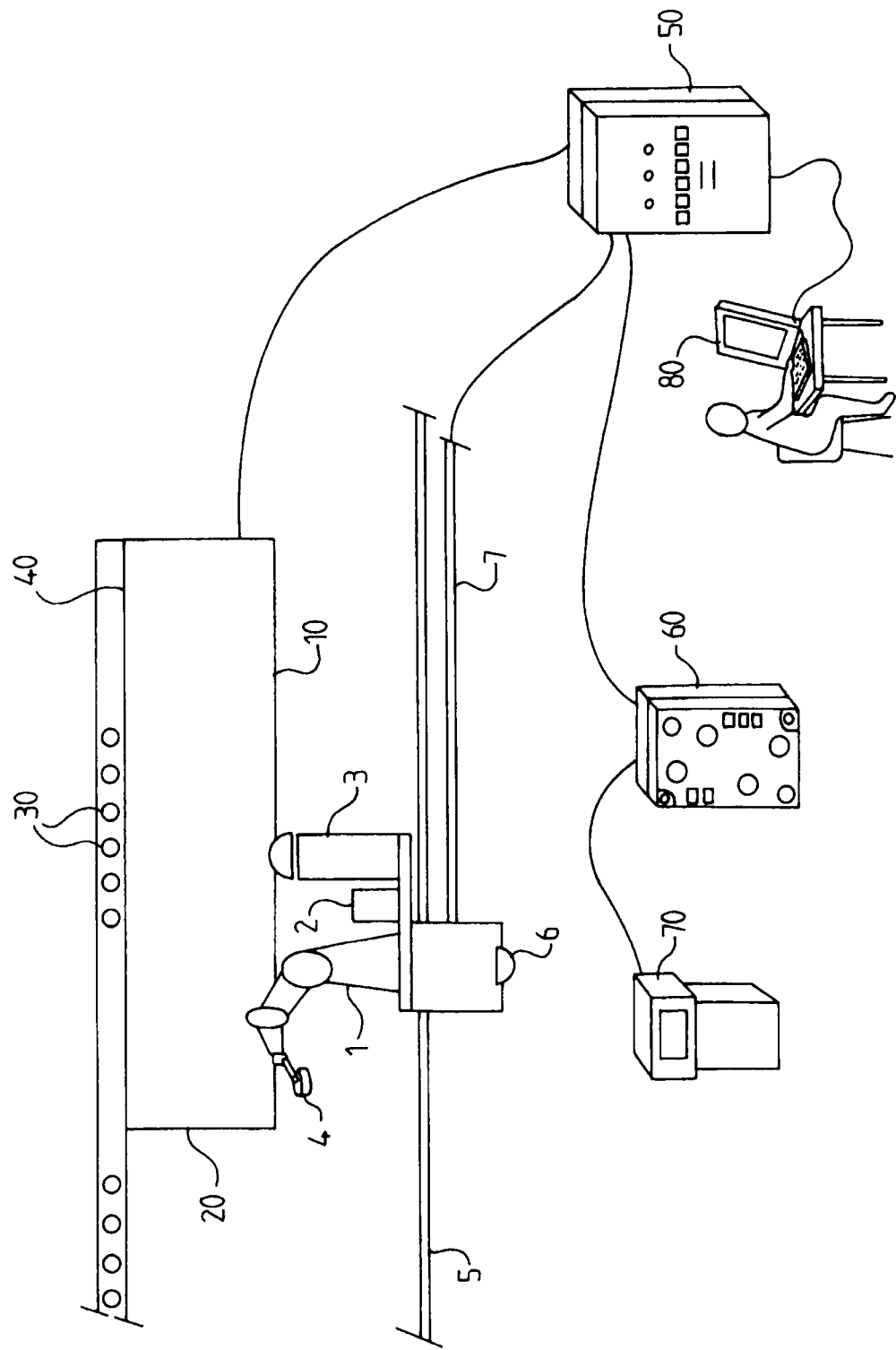

AUTOMATIC SUBSTITUTION OF BLANK MOLDS IN THE MANUFACTURE OF HOLLOW GLASS PRODUCTS

TECHNICAL FIELD

The present invention relates to the manufacture of hollow glass products, such as bottles, flasks or pots.

SUMMARY

This manufacture employs I.S. (individual section) machines in which each section is intended to treat one or more parisons simultaneously, each parison being received and treated in a dedicated blank mold and then a dedicated finishing mold.

The blank mold consists of two half-molds defining a vertical parting line.

The two half-molds close up on a ring mold then located at the lower end of the blank mold.

The blank mold also includes a punch, the profile of which determines the inside of the ring.

The parison is charged into the blank mold under gravity, via its open upper end surmounted by a funnel.

In the press-and-blow process, this charging operation is carried out in the standby position of the punch. The upper end of the blank mold is then closed via the bottom and then the punch undertakes a movement starting from the ring mold upward, driving the parison with it. After the bottom of the mold (upper portion) has been filled, the glass passes through the pressing channels to form the ring.

In the blow-and-blow process the charging of the parison is carried out in the high position of the punch, which however is relatively short. The upper end of the blank mold is connected to a means for compressing the bottom of the parison, having the effect of forming the ring. This upper end is then closed by the blank mold bottom, the punch is lowered and the blank is pierced by blowing.

The blank mold bottom and the two half-blank molds are opened and the blank held by the ring mold is transferred into the finishing mold by being inverted about a horizontal axis.

The forming of the blank into a finished product is accomplished in three phases:
elongation of the blank under its own weight;
inflation of the elongated blank; and extraction of the bottle.

One important source of visible defects on the surface of the finished product stems from the relatively violent contact between the parison and the surface of the impression of the blank mold during charging. It is necessary, to eliminate these defects, to ensure the surface quality of the impression and to make the parison slide over the surface of the impression, by periodically greasing the latter.

It is possible, in certain cases, to improve the surface quality of the impression by abrasion or the like. However, when this quality has deteriorated excessively, it is necessary to replace the blank mold.

This replacement operation is normally carried out by an operator. Of course, it is necessary to stop the section in question for a sufficient time.

The blank molds are heavy and relatively inaccessible, so that the operator has to carry them with his spinal column in a forwardly inclined position, which may cause tensions, pain or lesions.

In addition, the operator is working in a noisy and high-temperature environment.

The inventors were given the objective of designing a novel process in which a blank mold is replaced in a minimum amount of time and without causing the operator to experience the aforementioned problems.

This objective is achieved by the invention, one subject of which is a process for manufacturing a hollow glass product by means of an I.S. machine and a robot that can move alongside the blank molds of said machine, characterized in that the robot is capable of replacing one or more blank molds, section after section.

The robot is especially designed for replacing all the blank molds within a section.

For this purpose, the robot preferably carries an electromagnet, or as many electromagnets as there are blank molds in a section of the I.S. machine. Thus, preferably one electromagnet is assigned replacing a blank mold, although the invention does not exclude the possibility of several blank molds being able to be replaced simultaneously by a single electromagnet, provided that it has a shape and characteristics suitable for this purpose. In another advantageous embodiment, the robot carries only a single electromagnet suitable for replacing a single blank mold at a time, but enabling several molds to be replaced in succession.

In the process of the invention, advantageously the replacement of a blank mold comprises:
closing the two half-shells of the blank mold by exerting pressure;
operating the electromagnet;
releasing the pressure; and then
disengaging the blank mold.

Preferably, the robot is capable of carrying several tools having different functions, simultaneously and/or alternately. One or more of these tools may be removable.

Thus, according to preferred features of the process of the invention:
the robot is capable of greasing one or more blank molds, section after section, especially by spraying them;
the robot is capable of measuring temperatures of one or more blank molds, section after section, in particular by the fact that it carries an optical pyrometer, an infrared window, or the equivalent (it monitors the temperature level of the blank molds and checks that the temperatures of the two constituent half-shells are the same);
the robot is capable of cleaning the impression of one or more blank molds, section after section; for example, for this purpose it carries an abrasive tool, such as a brush, which is rotated; and
the robot is capable of taking images of one or more blank molds and finishing molds, section after section, and therefore carries, in particular, a camera linked with at least one image processing or recognition software package.

Another subject of the invention is an I.S. machine for manufacturing hollow glass products, comprising a robot that can move alongside blank molds, characterized in that the robot is capable of carrying several tools having different functions, simultaneously and/or alternately.

These tools are preferably chosen from an electromagnet and/or a spray tube for greasing and/or an optical pyrometer, an infrared window or equivalent and/or a rotary abrasive tool and/or a camera or equivalent.

BRIEF DESCRIPTION OF THE DRAWINGS

The invention will now be illustrated by the following example, with reference to the appended FIG. 1, which is an overall schematic representation of the device for replacing a blank mold according to the invention, which is connected to interfaces useful for its operation.

DETAILED DESCRIPTION

Example

Referring to FIG. 1, a six-axis robot 1 carries an electromagnet 4, for replacing a single blank mold at a time, or several blank molds in succession. The robot 1 is placed alongside the blank molds 10 of an I.S. machine 20. Bottles 30 are produced on the finishing molds 40 of the I.S. machine 20.

A control unit 50 connects the robot 1 to the I.S. machine 20, making it possible to control the activity sequences of the robot 1 and to adapt one or more operating cycles for the section on which the robot 1 is intervening. The control unit 50 also receives from the I.S. machine 20 information such as the presence of defects on the bottles 30 that are liable to trigger the intervention of the robot 1 on the section in question.

The control unit 50 also receives information from the robot 1 itself, such as the proximity of a foreign body, causing the movement of the robot to be adapted or to stop the robot, and also causing the operation of the I.S. machine to be adapted.

The control unit 50 is connected to an electrical module 60 which is itself connected to a computer 70, both being dedicated to the movements of the robot.

Finally, the control unit 50 is connected to a terminal 80 via which an operator can examine, but also intervene on, the operation of the entire assembly.

The six-axis robot 1 is mounted so as to move translationally on a rail 5 running alongside the blank molds of an I.S. machine (not shown). The various cables connected to the robot 1 (power supply, robot movement control, compressed-air supply, etc.) are combined on a cable-carrying chain 7 that compensates for the translational movement of the robot 1.

The robot 1 is equipped with a detector 6, for detecting foreign bodies, connected to an automatic stop mechanism. Moreover, the robot arm has an automatic deceleration function that reduces the effect of any contact, for example in the event of incorrect operation of the detector 6.

The robot 1 includes a motor 2 that moves it translationally.

It carries an electromagnet 4 suitable for successively replacing the two blank molds of the sections of a double-parison I.S. machine. The robot 1 includes an oil reservoir 3 and a 5-bar air supply, these being intended to be connected to spray tubes (not shown), which are optionally removable, for greasing the blank molds.

The activity of the electromagnet 4 will now be described.

The blank mold to be replaced is closed in accordance with a special cycle of the I.S. machine. The arm of the robot 1 carrying the electromagnet 4 is positioned above the blank mold to be replaced.

The arm of the robot 1 is lowered down to the still-closed blank mold by applying pressure and the electromagnet is activated.

The pressure for closing the blank mold is removed.

The blank mold is slightly raised, so as to free the fitting zones.

The blank-mold holder is opened and then the blank mold is removed and deposited by deactivating the electromagnet.

To put the new blank mold into place, the reverse operations are carried out.

The other blank mold of the section can then be replaced by the same process.

The replacement of a blank mold may be slaved to the detection of defects on the bottles 30, as indicated above. It is also possible to carry out the process automatically at regular time intervals or after a predetermined number of cycles of the I.S. machine.

Other remedies for defects detected on the bottles are available.

A first remedy consists in greasing the blank mold, especially using an oil spray tube carried by the robot, which is optionally removable, simultaneously with the electromagnet and all other tools, or alternately.

A second remedy consists in cleaning the impression of the blank mold using a rotary abrasive tool, which is also optionally removably carried by the robot, simultaneously with all other tools, or alternately.

In the same way, the robot is capable of carrying, in addition or alternatively, and also optionally removably:
  one or more temperature measurement instruments (such as an optical pyrometer);
  one or two cameras (one per constituent blank mold of the section) associated with at least one image processing or recognition software package in order to recognize, for example, an open position of the mold or to identify the latter (identification numbers).

The invention claimed is:

1. A process for replacing a blank mold used in manufacturing a hollow glass product with an I.S. machine and a robot that can move alongside blank molds of the I.S. machine, wherein the robot is configured to replace one or more blank molds, section after section, and includes an electromagnet, the process comprising:
  connecting the I.S. machine to the robot via a control unit;
  sending defect information from the I.S. machine to the control unit regarding a presence of defects on one or more of the hollow glass products;
  determining that a blank mold needs to be replaced based on the defect information sent to the control unit regarding the presence of defects on one or more of the glass products;
  closing two half-shells of the blank mold by exerting pressure in a blank mold holder;
  positioning an arm of the robot carrying the electromagnet above the blank mold;
  lowering the arm of the robot down to the closed blank mold;
  activating the electromagnet;
  releasing the pressure on the blank mold; and then
  raising the blank mold slightly so as to free fitting zones;
  opening the blank mold holder;
  removing the blank mold from the mold holder;
  depositing the blank mold;
  deactivating the electromagnet; and
  replacing a new blank mold in the I.S. machine,
  wherein the robot is configured to simultaneously carry a plurality of tools having different functions, each of the plurality of tools configured to perform a process on the blank molds,
  wherein the plurality of tools includes a spray tube for greasing and an abrasive tool or brush which is rotated.

2. The process as claimed in claim 1, wherein the robot is configured to grease one or more blank molds, section after section, or greasing by spraying one or more blank molds.

3. The process as claimed in claim 1, wherein the robot is configured to measure temperatures of one or more blank molds, section after section.

4. The process as claimed in claim 3, wherein the robot carries an optical pyrometer or an infrared window.

5. The process as claimed in claim 1, wherein the robot is configured to clean an impression of one or more blank molds, section after section.

6. The process as claimed in claim 1, wherein the robot is configured to take images of one or more blank molds and finishing molds, section after section.

7. The process as claimed in claim 6, wherein the robot carries a camera linked with at least one image processing or recognition software package.

8. An I.S. machine for implementing a process for manufacturing hollow glass products as claimed in claim 1, comprising:

a robot that can move alongside blank molds.

9. The I.S. machine as claimed in claim 8, wherein the tools further include an electromagnet, and/or an optical pyrometer, and/or an infrared window or equivalent, and/or a camera.

* * * * *